Dec. 30, 1941.  H. R. REYNOLDS  2,267,875
BEARING SEAL
Filed Jan. 5, 1939
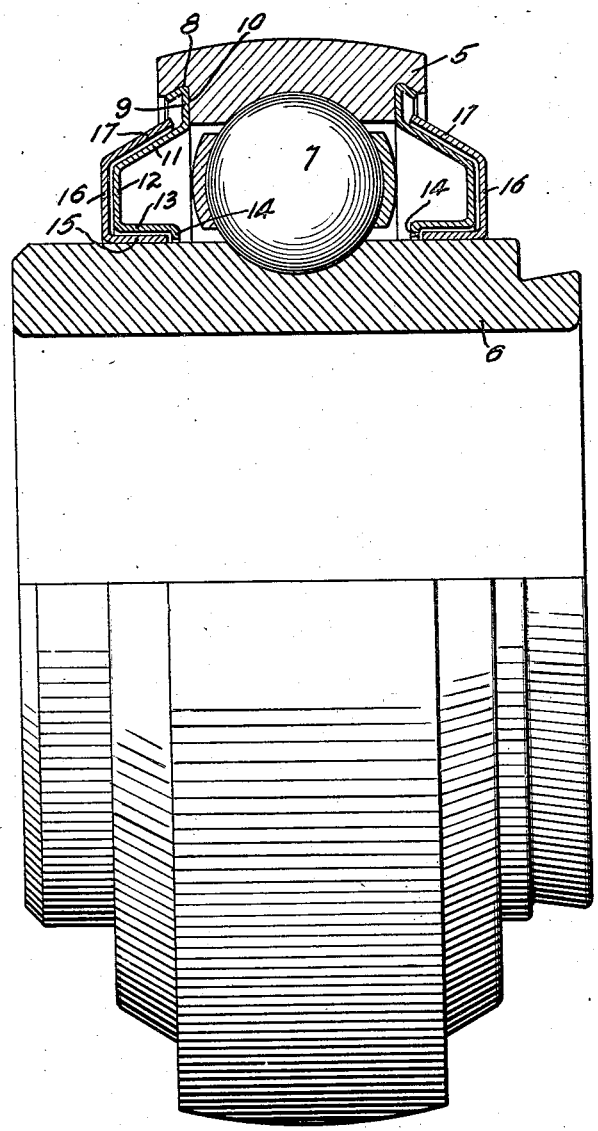
INVENTOR
HARRY R. REYNOLDS
BY
*Mitchell Bechert*
ATTORNEYS Patented Dec. 30, 1941

2,267,875

UNITED STATES PATENT OFFICE 2,267,875

BEARING SEAL

Harry Rundle Reynolds, New Britain, Conn., assignor to The Fafnir Bearing Company, New Britain, Conn., a corporation of Connecticut Application January 5, 1939, Serial No. 249,369

2 Claims. (Cl. 286—5)

My invention relates to a bearing seal.

It is an object of the invention to provide an improved form of seal which is simple in construction and effective in retaining lubricant in and excluding foreign matter from a bearing.

Other objects and various features of novelty and invention will be hereinafter pointed out or will become apparent to those skilled in the art.

The drawing which shows, for illustrative purposes only, a preferred form of the invention, illustrates an edge view of a bearing in quarter section showing my improved seal.

The more or less conventional bearing illustrated comprises an outer bearing ring 5, an inner bearing ring 6 with interposed anti-friction bearing members, such as balls 7. In the form shown the outer bearing ring has a spherical outer surface to be received in a correspondingly formed seat to take care of shaft misalignment, as will be understood. The bearing is of the so-called long inner ring type, wherein the inner bearing ring is substantially longer than the outer bearing ring and has an extended longitudinal bearing on the shaft to be received in the bore. The two rings have raceways for receiving the balls 7 which hold the two rings in unit handling relationship.

My improved seal includes means for effectively retaining lubricant in the bearing and excluding foreign matter therefrom. In the form illustrated the outer bearing ring is provided with a counterbore and undercut groove 8 at the edge thereof, and a seal member 9 of sheet metal or the like has its outer edge spun, swaged or otherwise secured in the groove so as to securely hold the same in place. A part of the seal 9 preferably abuts flatwise, as indicated at 10, against the bottom of the counterbore to assist in providing a substantially lubricant-tight fit between the seal and the outer bearing ring. The seal 9 may be said to consist of an annular, generally trough or channel shaped member extending between the two rings. As illustrated the seal 9 has a plate or flange part 11, flared or extending generally radially inwardly and longitudinally outwardly from the balls 7. The seal has a further plate or flange part 12, which may extend generally radially inwardly, and another plate or flange part 13 constituting in effect a sleeve surrounding the inner bearing ring and spaced slightly therefrom. The extreme inner edge of the seal 9 is preferably turned inwardly as at 14 and extends into sealing proximity to the outer surface of the inner bearing ring.

A second seal and flinger member is carried by the inner bearing ring and preferably comprises a sleeve member 15, securely fitting the outer surface of the inner bearing ring and extending into the space between the sleeve part 13 and the inner bearing ring and being in clearance relation and sealing proximity to the sleeve 13. The inner edge of the sleeve 15 extends into sealing proximity to the inwardly directed flange 14. The seal on the inner ring preferably substantially follows the contour of the seal on the outer ring. Therefore, the sleeve 15 may have a generally radially outwardly directed flange part 16 following the form of the flange part 12 and an outer flange part 17 substantially following the flange part 11 and terminating adjacent the outer edge of the seal on the outer bearing ring. The two seal parts carried by the two bearing rings are in sealing proximity to each other and provide an effective type of labyrinth much longer than could be obtained with straight seal plates and the chances of foreign matter working into the bearing between the seal plates is reduced to a minimum. A further advantage of making the seals of generally trough or channel shape is that an added supply of lubricant may be carried in the bearing. If desired both sides of the bearing may be sealed by seals of the type described.

When the outer ring is fixed and the inner ring rotated as is usual in anti-friction bearings, any foreign matter striking the inner ring seal will tend to be thrown off centrifugally thereby. Any foreign matter tending to work its way in the clearance space between the two rings will also have a tendency to be thrown centrifugally outwardly and away from the bearing space. Furthermore, any lubricant finding its way into the clearance space between the seal members will serve as an effective seal against the entry of foreign matter. The inwardly directed flange 14 being in rather close clearance relation with the outer surface of the inner bearing ring will serve to effectively retain lubricant in the bearing and in fact the seal carried by the outer ring acts as a holder or barrier for the lubricant. It has been found that a bearing having an extended labyrinth-like clearance passage between seal members and a rotating flinger at the outside will effectively reduce the danger of foreign matter working into the bearing space. The parts are all simple in construction and easy to apply by well known methods.

While the invention has been described in considerable detail and a preferred form shown, it is to be understood that various changes may be made within the scope of the invention as defined in the appended claims.

I claim:

1. The combination with a pair of rings disposed one within the other and held in radially spaced relationship and against substantial relative movement axially, the outer end of said rings having an annular groove in its inner face adjacent the end of an outwardly deformed seal member having its outer edge secured in said annular groove in the outer of said rings and extending across the space between said rings, said seal member having a generally cylindrical flange forming a sleeve directed axially inwardly and spaced from the outer surface of the inner of said rings, and a second seal member including a sleeve securely fitting the outer surface of the inner of said rings and positioned within and in sealing clearance relation with said first mentioned sleeve, said sleeve on said inner ring having a generally outwardly directed flinger-flange member following the lateral contour of and in sealing clearance relation to the outer surface of said seal member carried by the outer of said rings and terminating radially short of and adjacent to said annular groove, both of said seal members being formed of sheet metal each of uniform thickness throughout, all adjacent surfaces of said two seal members being substantially parallel and substantially uniformly spaced in sealing relationship to each other.

2. The combination with a pair of rings disposed one within the other, the outer of said rings having an undercut groove at the edge thereof, of a seal member including a sheet metal annular member having its outer edge secured in said groove, said seal member having a flange portion extending generally radially inwardly and longitudinally outwardly, a second flanged portion extending generally radially inwardly, another flanged portion extending generally longitudinally inwardly slightly spaced from and surrounding the outer surface of the inner of said rings, and a terminal inner flange directed generally radially inwardly toward said inner ring, and a second seal member including a sleeve frictionally secured on the outer surface of said inner ring and interposed between said flange surrounding said inner ring and slightly spaced therefrom, said second seal member having flanged portions substantially following the outside contour of said flanged portions on said first mentioned seal member carried by said outer ring and lying throughout in sealing proximity thereto.

HARRY RUNDLE REYNOLDS.